United States Patent [19]
Krueger et al.

[11] Patent Number: 5,834,874
[45] Date of Patent: Nov. 10, 1998

[54] ALTERNATOR WITH MECHANICALLY ADJUSTABLE OUTPUT

[75] Inventors: William R. Krueger, New Berlin; Daniel R. Dykstra, Wales; David W. Windstein, Pewaukee, all of Wis.

[73] Assignee: Outboard Marine Corporation, Waukegan, Ill.

[21] Appl. No.: 941,586

[22] Filed: Sep. 30, 1997

[51] Int. Cl.[6] ........................................ H02K 1/00

[52] U.S. Cl. .................. 310/191; 310/209; 310/254; 310/67 R; 310/76; 310/156

[58] Field of Search .................... 310/254, 191, 310/209, 67 R, 76, 156

[56] References Cited

U.S. PATENT DOCUMENTS

| | | | |
|---|---|---|---|
| 2,453,523 | 11/1948 | McCullough | 171/209 |
| 2,492,810 | 12/1949 | McDermott | 171/209 |
| 3,090,879 | 5/1963 | Lohest | 310/209 |
| 3,401,290 | 9/1968 | Potter | 310/191 |
| 3,525,005 | 8/1970 | Beyers | 310/156 |
| 4,578,609 | 3/1986 | McCarty | 310/156 |
| 4,734,604 | 3/1988 | Sontheimer et al. | 310/76 |
| 4,920,295 | 4/1990 | Holden et al. | 310/209 |

*Primary Examiner*—Steven L. Stephan
*Assistant Examiner*—Thanh Lam
*Attorney, Agent, or Firm*—Jones, Day, Reavis & Pogue

[57] ABSTRACT

Proportional control of the output of an alternator achieved mechanically to change the reluctance of the magnetic path between the stator and the rotor and thereby change the electrical output of the alternator.

15 Claims, 3 Drawing Sheets

ALTERNATOR WITH MECHANICALLY ADJUSTABLE OUTPUT

BACKGROUND OF THE INVENTION

1. Field of the Invention

The present invention relates in general to alternators and in particular to a permanent magnet alternator whose output voltage can be mechanically regulated by varying the magnetic flux flow path through the alternator windings.

2. Description of Related Art

Permanent magnet alternators are well known in the art and there are a variety of systems for controlling the output voltage thereof. In U.S. Pat. No. 3,401,290, the stator is actually movable with respect to the rotor for adjusting the voltage.

In U.S. Pat. No. 4,578,609, a variable voltage permanent magnet alternator is disclosed in which a permanent magnet rotor is located within a hollow cylindrical stator. On the outside of the stator are first and second annular iron members that are axially movable with respect to the stator for causing an increase or decrease in magnetic flux flow through the stator windings. Thus by moving the magnetic members axially from a first position creation maximum magnetic flux flow to a second position creating minimum magnetic flux flow there is a smooth and continuous regulation of the output voltage.

These existing systems are quite complicated and require some substantial length of the alternator in order for either the rotor or magnetic flux carrying plates to move axially with respect to the stator.

SUMMARY OF THE INVENTION

The present invention relates to an alternator in which a hollow cylindrical stator having a plurality of spaced windings thereon is attached to a housing. A permanent magnet rotor is mounted on the housing on one side of the stator for rotation with respect to the stator. Alternating polarity permanent magnets are placed on the stator for inducing magnetic flux into the stator windings as the rotor rotates. A mechanically operable ring is mounted on the other side of the stator for arcuate movement between first and second positions with respect to the stator. Magnetic flux carrying members on the ring create a maximum magnetic flux flow path through the windings from the permanent magnets when the ring is in a first position and creates a minimum magnetic flux flow path through the windings when the ring is in the second position.

Thus the mechanically operable ring may have spaced teeth thereon equal in number to the windings and that carry magnetic flux. In one embodiment, the teeth extend radially outwardly and have an outer face thereon for juxtaposed radial alignment with a corresponding one of the interfaces on each winding core to create a maximum magnetic flux flow through the electrical windings in the first position of the ring and for radial alignment interposed between adjacent ones of the interfaces on each of the winding cores to create a minimum magnetic flux flow through the windings in the second position of the ring.

In a second embodiment, the permanent magnet rotor is placed on the inside of the hollow cylindrical stator and the ring having the teeth thereon for adjusting the magnetic flux flow path is rotatedly mounted on the outside of the stator. Otherwise it functions as the first embodiment.

In a third embodiment, instead of changing an air gap by rotating a toothed ring as in the first two embodiments, the air gap is created by a number of cam followers which slide into and out of slots between the pole pieces. The cam followers are manufactured separately and joined with a nonmagnetic ring. The cam is a disk with a number of grooves in which pegs extending laterally from the respective cam followers are slideably mounted. The position of the cam is controlled by a linkage to rotate the cam and thus cause the pegs or pins to ride up and down in the grooves or slots to cause the cam followers to move in and out of the slots between the pole pieces thereby changing the magnetic flux flow path.

Thus it is an object to the present invention to provide a toothed wheel in radial alignment with pole pieces inside the stator such that the tooth wheel can be rotated creating a variable air gap in the magnetic path thereby causing the alternator output to be proportional to the size of the air gap.

It is another object to the present invention to provide a stator that is made with pole pieces wound separately then joined together with a nonmagnetic ring and having a toothed wheel whose teeth align with the pole pieces placed outside the stator and rotated to create a variable air gap in the magnetic path and provide and cause an alternator output that is proportional to the size of the air gap.

It is still another object of the present invention to provide an alternator having a variable air gap in the magnetic path that is created by a number of cam followers that slide into and out of slots between the pole pieces.

Thus the present invention relates to an alternator with a mechanically adjustable output comprising a housing, a hollow cylindrical stator fixedly attached to the housing, a plurality of spaced windings on the stator for generating electricity, a permanent magnet rotor mounted on the housing on one side of the stator for rotation with respect to the stator, alternating polarity permanent magnets on the rotor for inducing magnetic flux into the windings as the rotor rotates, a mechanically operable ring mounted on the other side of the stator for arcuate movement between first and second positions with respect to the stator, and magnetic flux carrying members on the ring for creating a maximum magnetic flux flow path through the windings from the permanent magnets when the ring is in the first position and for creating a minimum magnetic flux flow path through the windings when the ring is in the second position.

BRIEF DESCRIPTION OF THE DRAWINGS

These and other objects of the present invention will be more fully disclosed when taken in conjunction with the following DETAILED DESCRIPTION OF THE DRAWINGS in which like numerals represent like elements and in which.

DETAILED DESCRIPTION OF THE INVENTION

Figure 1:
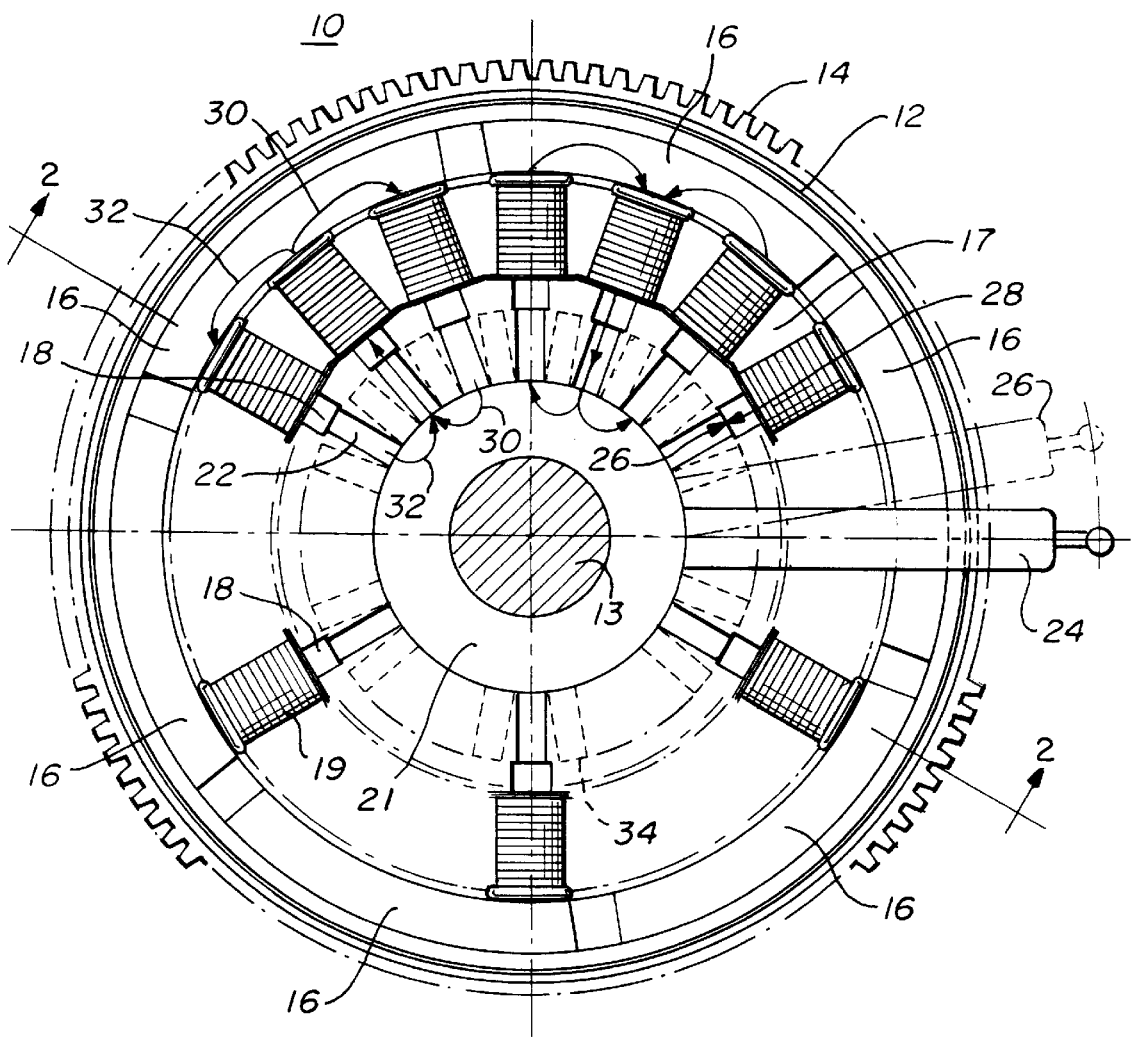
FIG. 1 is a schematic end view of the novel alternator of the present invention in a first embodiment in which the permanent magnet rotor is on the outside of the stator.

FIG. 1 is a schematic representation of an end view of the novel alternator 10 of the present invention in which proportional control of the output of the alternator 10 can be achieved by mechanically altering the relationship between the rotor 12 and the stator 17. As can be seen in FIG. 1 the alternator 10 has a rotor 12 rotatedly mounted to a housing 20 (shown in FIG. 2) in any well known manner. The rotor 12 has teeth 14 thereon that may be used for a variety of purposes well known in the art. It also has a plurality of permanent magnets 16 spaced around the inner periphery of the rotor 12. A stator 17 is formed of a nonmagnetic ring and attached in any well known manner to the housing 20. A plurality of coils 19 wound around magnetic of pole pieces 18 are wound separately and then joined together with the nonmagnetic ring 17 in a well-known fashion. Each winding or coil 19 has magnetic core 18 protruding inwardly therefrom with a face 26.

Each of the magnetic teeth 22 extending outwardly from magnetic ring 21 has an outer face 28 for juxtaposed radial alignment with the corresponding one of the interfaces 26 on each magnetic core 18 to create a maximum magnetic flux flow path through the electrical windings or coil 19 when in the engaged position shown by linkage member or arm 24. Thus the magnetic flux flows through the paths illustrated by arrows 30 and 32 to provide a maximum output voltage from the alternator.

However, when the linkage or arm 24 is moved to the position 26 illustrated in phantom lines, the magnetic teeth 22 on magnetic ring 21 are moved to the position shown in phantom lines 34. At that point, of course, since the magnetic flux carrying teeth 22 are misaligned between adjacent core members 18 of the coils 19, there is a minimum magnetic flux flow path and a minimum output from the alternator. Thus is can be seen that the proportional control of the output of the alternator 10 is achieved by mechanically altering the magnetic flux flow path between the stator 17 and the rotor 12.

Thus the hollow cylindrical stator 17 is fixedly attached to the housing 20 (FIG. 2) in any well known manner. A plurality of spaced windings 19 are joined together with the nonmagnetic ring 17 for generating electricity. A permanent magnet rotor 12 is mounted on the housing 20 on the outside of the stator 17 for rotation with respect to the stator 17 about shaft 13. Alternating polarity permanent magnets 16 are mounted on the rotor 12 for inducing magnetic flux into the windings 19 as the rotor 12 rotates. The mechanically operable ring 21 is mounted on the inside of the stator 17 for arcuate movement between a first position 24 and a second position 26 with respect to the stator 17. Magnetic flux carrying members or teeth 22 are formed on the mechanically operable magnetic ring 21 for creating a maximum magnetic flux flow path through the windings 19 from the permanent magnets 16 when the ring 21 is in the first position with the teeth 22 in radial alignment with the windings 19 and for creating a minimum magnetic flux flow path through the windings 19 when the ring 21 is in the second position 26 and the magnetic flux carrying teeth and ring are in the second position with the teeth 22 radially interposed between windings 19.

Figure 2:
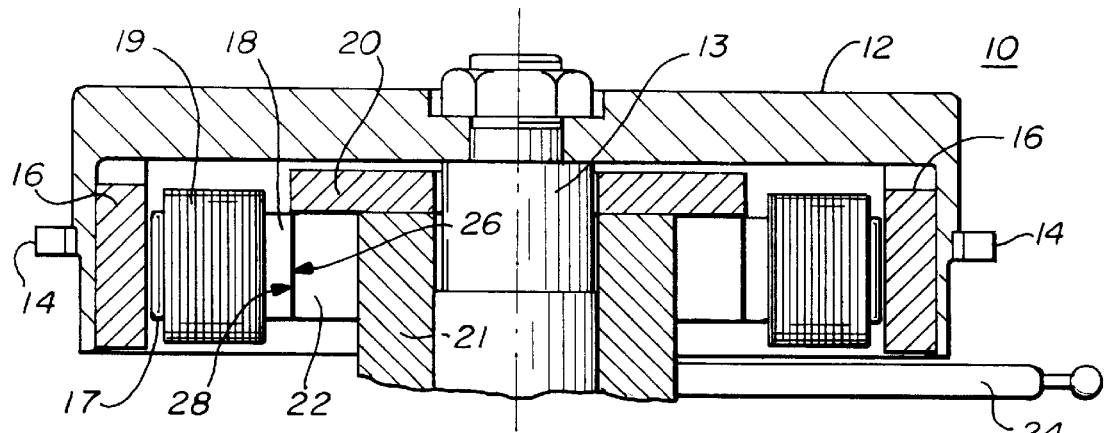
FIG. 2 is a partial cross sectional top view of the alternator of FIG. 1.

Thus in the first embodiment shown in FIG. 1 and FIG. 2, the rotor 12 is in the form of a hollow cylinder, the stator 17 is mounted inside the hollow rotor 12 and the mechanically operable magnetic ring 21 is mounted to the housing 20 for arcuate movement inside the stator 17.

Figure 3:
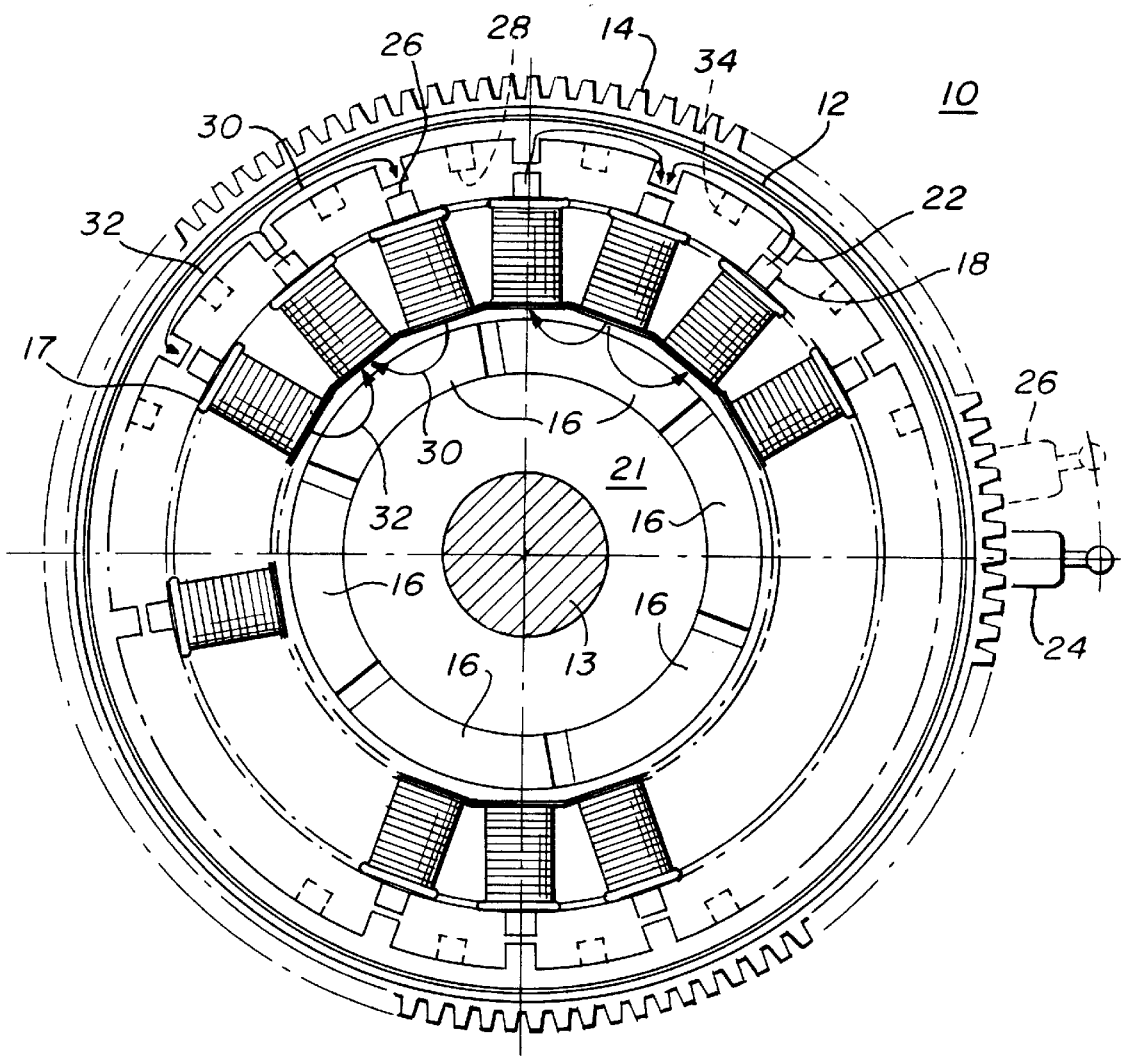
FIG. 3 is a partial schematic end view of an alternate embodiment of the present invention in which the permanent magnet rotor is mounted on the inside of the hollow cylindrical stator.

In the embodiment shown in FIG. 3, the alternator 10 functions in the identical manner as in FIG. I except that in the second embodiment, the rotor 12 is a solid cylinder mounted inside the hollow cylindrical stator 17 for rotatable movement therein and the mechanically movable ring 21 is magnetic flux conducting and is mounted to the housing for arcuate movement around the outside of the stator 17. Again, in the first position of the linkage or arm 24 the teeth 22 on magnetic ring 21 are in radial alignment with the core 18 of the windings 19 to create a maximum magnetic flux flow path through the windings as the magnets 16 pass the windings 19 during rotation of rotor 12. However, when the linkage assembly or arm 24 is moved to position 26 shown in phantom lines, the teeth 22 move to the position 34 (shown in phantom lines) radially interposed between adjacent windings 19 to create a minimum magnetic flux flow path thus allowing alternator output to be proportional to the air gap created by the arcuate movement of the magnetic ring 21 and its associated teeth 22.

Figure 5:
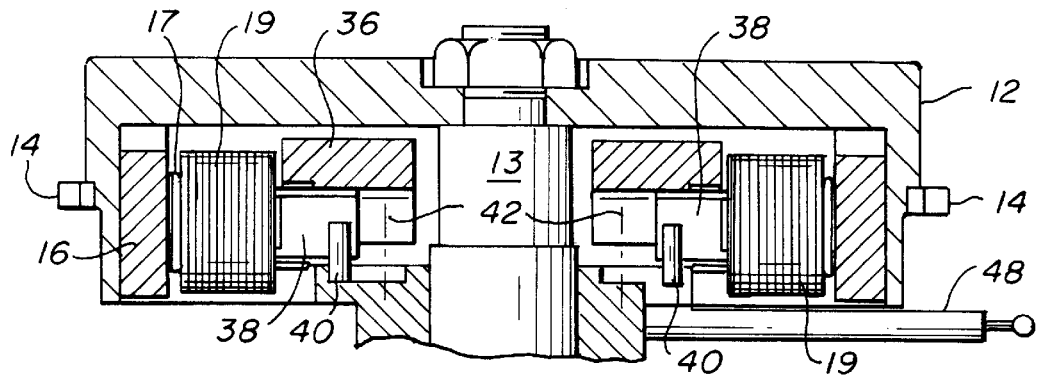
FIG. 5 is a partial schematic top view of the alternator of FIG. 4.
Figure 4:
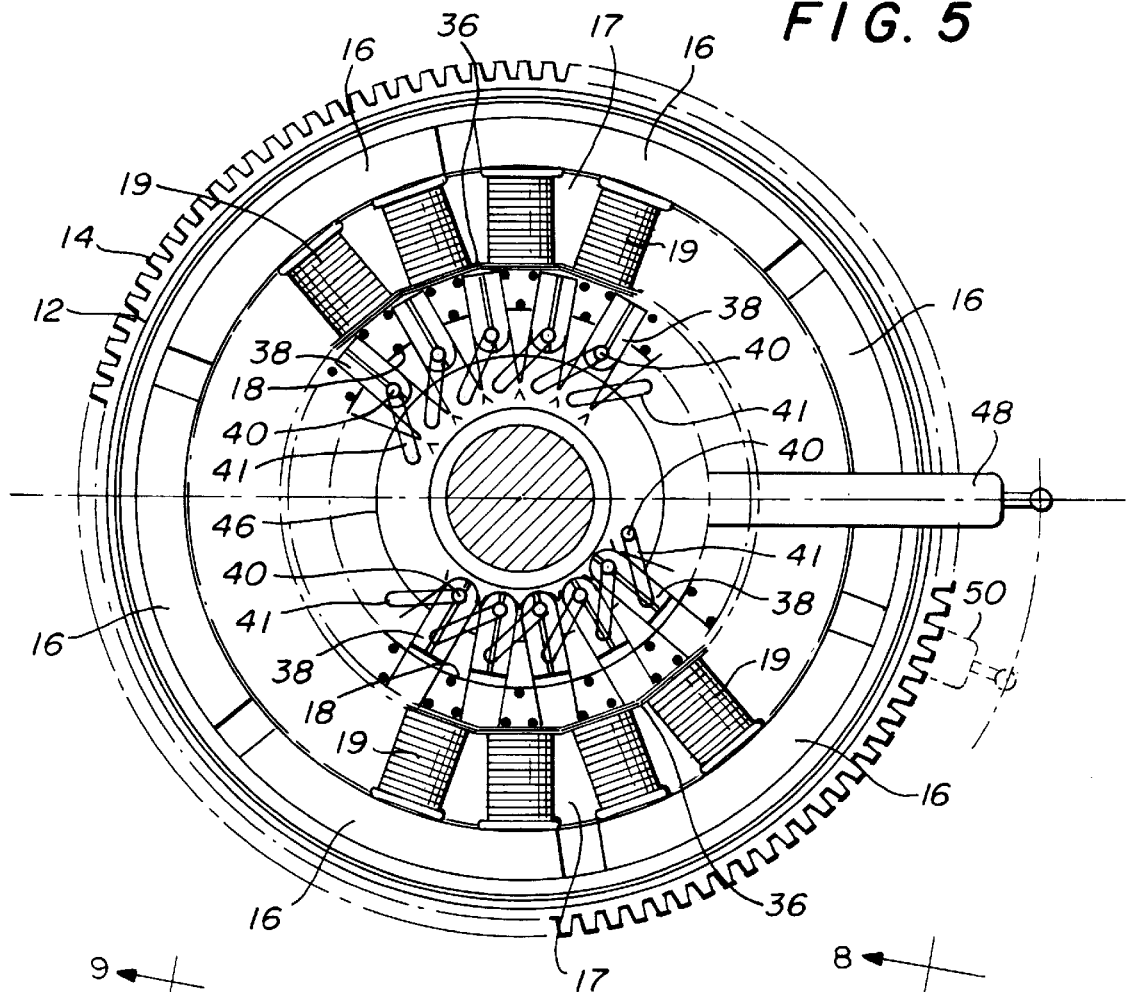
FIG. 4 is a schematic representation of an end view of a third embodiment of the present invention in which the air gap is varied by means of cams of magnetic material that move into and out of the spaces between pole pieces.

FIGS. 4 and 5 represent a third embodiment that works similarly to the first two embodiments but instead of changing the air gap by rotating a toothed ring, the air gap is created by a number of magnetic cam followers that slide into and out of slots between the pole pieces. The pole pieces are, of course as in the first case, manufactured separately and joined with a nonmagnetic ring that forms stator 17. The cam is a non-magnetic disk 36 with a number of grooves 41 in which pegs or pins 40 extending laterally from the cam followers 38 ride or are carried. The position of the cam disk 36 is controlled by the throttle linkage 48. Thus as can be seen in FIGS. 4 and 5, again, a rotor 12 having permanent magnets 16 thereon are rotatedly mounted to a housing in a well known manner and rotated about shaft 13 (FIG. 5). The stator 17 again has a number of windings 19 formed thereon with magnetic cores or pole pieces 18 inside of the coils and extending inwardly towards the nonmetallic annular slotted guide ring or cam 36.

Figure 8:
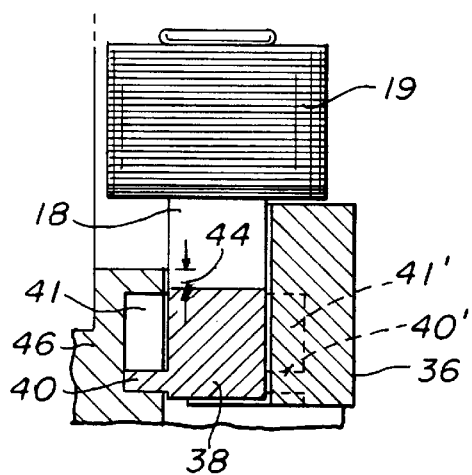
FIG. 8 is a cross-sectional view of FIG. 6 taken along lines 8—8.
Figure 6:
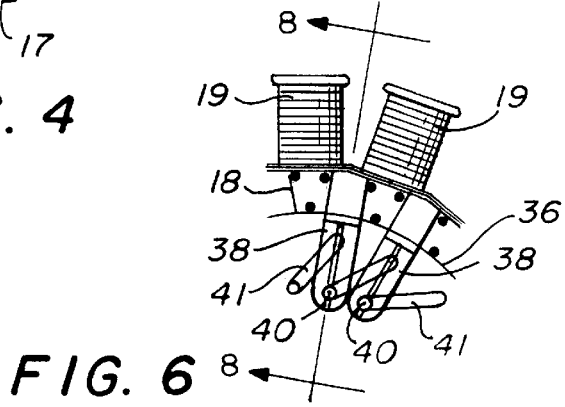
FIG. 6 is a partial schematic representation of the cam followers of FIG. 4 in their retracted position to create a minimum magnetic flux flow.

As can be best seen in FIGS. 6 and 8, when the handle 48 is moved to the position 50 shown in FIG. 4, the magnetic element or cam follower 38 is retracted as shown in FIGS. 6 and 8. FIG. 6 is an enlarged version of two of the coils 19, their associated pole pieces 18 and the magnetic cam followers 38 that glide upwardly and downwardly in slots 39 because of the camming action of the slots 41 with pins 40 inserted therein as disk 36 is rotated by handle 48 (shown in FIG. 4). Thus, as can be seen in FIGS. 6, 7, 8 and 9, the air gap is created by a number of magnetic cam followers 38 that slide into and out of slots 39 between the magnetic pole pieces 18 that are manufactured separately and joined with the nonmagnetic ring that forms stator 17. Magnetic cam follower 38 cooperates with the disk 36 having a number of grooves 41 therein in which pegs or pins 40 extending from the magnetic cam followers 38 ride. The position of the cam followers 38 is controlled by the throttle linkage 48. Note in both FIGS. 6 and 8, that when the magnetic cam followers 38 are retracted, a gap 44 exists between the magnetic pole pieces 18 and the magnetic cam followers 38 thus creating a large air gap.

Figure 9:
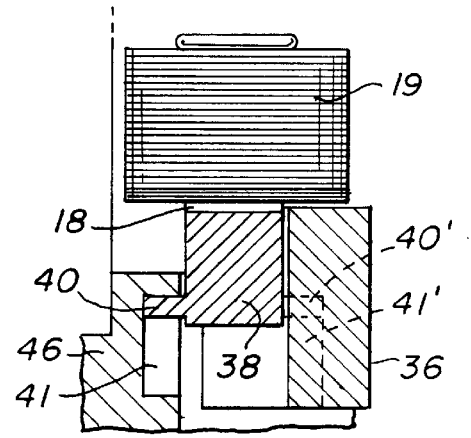
FIG. 9 is a cross-sectional view of FIG. 7 taken along lines 9—9.
Figure 7:
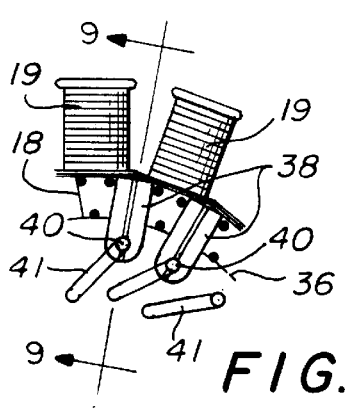
FIG. 7 is a schematic representation of the cam followers in the extended position between pole pieces to create maximum flux flow.

When the throttle linkage is in the position 48 shown in phantom in FIG. 4, the magnetic cam followers 38 are extended upwardly into the slots 39 as shown in FIG. 7 and FIG. 9. FIG. 9 is a cross-sectional view of FIG. 7 taken along lines 9—9. When the nonmagnetic disk 36 is rotated counterclockwise, because slots 41 are at an angle, the pins 40 ride upwardly thus forcing the magnetic cam followers 38 upwardly into the slots 39. The slots 39 are shown in FIG. 6. In that position, they are in close proximity with adjacent pole pieces 18 thus forming a complete magnetic path between adjacent pole pieces 18. The throttle linkage 48 is attached to the nonmagnetic disk 36 in any well known manner such as to a shoulder portion 46 shown in FIGS. 8 and 9.

While only one pin 40 is shown protruding from the magnetic cam 38 in FIGS. 8 and 9 into slot 41, obviously a second slot 41', (shown in phantom lines) could be formed in the nonmagnetic disk 38 with a second pin 40', extending laterally from the other side of the magnetic cam 38 and riding in slot 41', as illustrated in phantom lines in FIGS. 8 and 9.

For ease of illustration, the toothed wheel 12 and its associated magnets 16 are not shown in FIGS. 6, 7, 8 and 9. They are shown however in FIGS. 4 and 5.

Thus with the second embodiment, a variable air gap is created by the magnetic cam followers 38. By rotating the nonmagnetic disk 36, the magnetic cam followers 38 are caused to slide into and out of the slots 39 between the magnetic pole pieces 18. The nonmagnetic disk 36 has a number of grooves 41 as shown in FIG. 4 in which a corresponding peg or pin 40 extending laterally from a magnetic cam follower 38 is movably located.

Thus there has been disclosed a proportional control of the output alternator by mechanically altering the magnetic flux flow path relationship between the stator and the rotor. This is accomplished in the first embodiment disclosed herein by using a stator that is made with pole pieces wound separately then joined together with a nonmagnetic ring. A toothed wheel whose teeth align or misalign with the winding pole pieces is placed inside the stator. This toothed wheel is then rotated creating a variable air gap in the magnetic path. Alternator output will be proportional to the size of this air gap. The position of the wheel is controlled by the throttle linkage.

In a second embodiment, the toothed wheel is placed on the outside of the stator and is moved between first and second positions to change the magnetic flux flow path from a maximum to minimum.

In the third embodiment, instead of changing the air gap by rotating a toothed ring, the air gap is created by a number of magnetic cam followers which slide into and out of slots between the magnetic pole pieces. The pole pieces are manufactured separately and joined with a nonmagnetic ring. The magnetic cams cooperate with a disk having a number of grooves therein in which pegs or pins, laterally extending from the cam followers, ride. The position of the cam followers is controlled by the throttle linkage.

The corresponding structures, materials, acts, and equivalents of all means or step plus function elements in the claims below are intended to include any structure, material, or act for performing the function in combination with other claimed elements as specifically claimed.

I claim:

1. An alternator with a mechanically adjustable output comprising:

a housing;

a hollow cylindrical stator fixedly attached to said housing;

a plurality of spaced windings on said stator for generating electricity;

a permanent magnet rotor mounted on said housing on one side of said stator for rotation with respect to said stator;

alternating polarity permanent magnets on said rotor for inducing magnetic flux into said windings as said rotor rotates;

a mechanically operable ring mounted on the other side of said stator for arcuate movement between first and second positions with respect to said stator; and magnetic flux carrying members on said ring for creating a maximum magnetic flux flow path through said windings from said permanent magnets when said ring is in said first position and for creating a minimum magnetic flux flow path through said winding when said ring is in said second position.

2. The alternator of claim 1 wherein:

said rotor is a hollow cylinder;

said stator is mounted inside said hollow rotor; and said ring is mounted to said housing for said arcuate movement inside said stator.

3. The alternator of claim 2 further including:

a magnetic core inside each of said stator windings for conducting magnetic flux, said core extending radially inwardly a predetermined distance from its respective stator winding;

an interface on each said core;

said ring carrying magnetic flux and having spaced teeth thereon extending radially outwardly and being equal in number to said coils; and an outer face on each of said teeth for juxtaposed radial alignment with a corresponding one of said interfaces on each said core to create a maximum magnetic flux flow through said electrical windings in said first position of said ring and for radial alignment interposed between adjacent ones of said interfaces on each of said cores to create a minimum magnetic flux flow through said windings in said second position of said ring.

4. The alternator of claim 1 wherein said mechanically movable ring further comprises a linkage member for arcuately moving said mechanically movable ring between said first and second positions.

5. The alternator of claim 2 wherein:

said rotor is a solid cylinder mounted within said hollow cylindrical stator for rotatable movement therein; and said mechanically movable ring is magnetic flux conducting and is mounted to said housing for arcuate movement around the outside of said stator.

6. The alternator of claim 5 further comprising:

a magnetic core inside each of said stator windings for conducting magnetic flux, said core extending radially outwardly a predetermined distance from its respective winding;

an outer face on each said core;

spaced teeth on said ring extending radially inwardly and being equal in number to said spaced coils; and an interface on each of said teeth for juxtaposed axial alignment with a corresponding one of said outer faces on each said core to create a maximum magnetic flux flow through said electrical windings in said first position of said ring and for axial misalignment with, and interposed between, adjacent ones of said outerfaces on each said core to create a minimum magnetic flux flow path through said windings in said second position of said ring.

7. The alternator of claim 6 wherein said mechanically movable ring further comprises a linkage member for arcuately moving said mechanically movable ring between said first and second positions.

8. The alternator of claim 2 further including:
a magnetic core inside each of said stator windings for conducting magnetic flux, said magnetic core extending radially inwardly a predetermined distance from its respective winding to form adjacent, spaced, extended core pairs; and
a plurality of magnetic flux carrying members equal in number to said stator windings and each being attached to said ring in a camming fashion for radial movement from a first position interposed between adjacent ones of a respective radially extending core pair for creating a maximum magnetic flux flow path through said windings from said permanent magnets to a second position radially withdrawn from between said respective core section pair for creating a minimum magnetic flux flow path through said windings.

9. The alternator of claim 8 wherein said mechanically movable ring further includes a linkage member for arcuately moving said ring between said first and second positions.

10. An alternator with a mechanically regulated output including:
a housing;
a hollow cylindrical stator fixedly attached to said housing and having a plurality of spaced electrical windings thereon for generating electricity;
a permanent magnet rotor rotatedly mounted on said housing on the outside of said stator in proximity to said electrical windings for inducing magnetic flux in said electrical windings as said rotor rotates to cause generation of said electricity;
a mechanically movable ring rotatedly mounted on said housing on the inside of said stator for conducting magnetic flux and having arcuate movement between first and second positions in relation to said stator; and
a plurality of teeth extending radially outwardly on said mechanically movable ring for conducting magnetic flux, said teeth being equal in number to the plurality of electrical windings such that arcuate movement of said ring to said first position radially aligns said teeth with corresponding ones of said windings to create a maximum magnetic flux flow path through said windings and arcuate movement of said ring to said second position radially misaligns said teeth and corresponding ones of said windings to create a minimum magnetic flux flow path through said windings thereby enabling the alternator generated output electricity to be mechanically adjusted between a maximum and a minimum value.

11. An alternator with a mechanically regulated output comprising:
a housing;
a hollow cylindrical stator fixedly attached to said housing and having a plurality of spaced electrical windings thereon for generating electricity;
a permanent magnet rotor rotatedly mounted on said housing on the inside of said stator in proximity to said electrical windings for inducing magnetic flux in said electrical windings as said rotor rotates to cause generation of said electricity;
a mechanically movable ring rotatedly mounted on said housing on the outside of said stator for conducting magnetic flux and having arcuate movement between first and second positions in relation to said stator; and
a plurality of teeth extending radially inwardly on said mechanically movable ring for conducting magnetic flux, said teeth being equal in number to the plurality of electrical windings such that arcuate movement of said ring to said first position radially aligns said teeth with corresponding ones of said windings to create a maximum magnetic flux flow path through said windings and arcuate movement of said ring to said second position radially misaligns said teeth and said corresponding ones of said windings to create a minimum magnetic flux flow path through said windings thereby enabling the alternator generated output electricity to be mechanically adjusted between a maximum and a minimum value.

12. An alternator with a mechanically regulated output including:
a housing;
a hollow cylindrical stator fixedly attached to said housing;
a plurality of spaced windings on said stator for generating electricity;
a magnetic core inside each of said stator windings for conducting magnetic flux, said core forming a pole piece extending radially inwardly a predetermined distance from its respective stator winding to form adjacent, spaced, pole pieces;
a permanent magnet rotor mounted on said housing for rotation about the outside of said stator;
alternating polarity permanent magnets on said rotor for inducing magnetic flux into said stator windings as said rotor rotates;
a mechanically operable nonmagnetic ring mounted on the inside of said stator for arcuate movement between first and second positions with respect to said stator; and
a plurality of magnetic flux carrying members equal in number to said stator windings and each having opposing sides and being slidably attached to said nonmagnetic ring for radial movement from a first position interposed between corresponding adjacent ones of radially extending pole pieces for creating a maximum magnetic flux flow path through said windings from said permanent magnets to a second position radially withdrawn from between adjacent ones of said respective pole pieces for creating a minimum magnetic flux flow path through said windings from said permanent magnets so as to vary the output of said alternator.

13. The alternator of claim 12 further including:
a plurality of sloping grooves, equal in number to said magnetic flux carrying members in said mechanically operable nonmagnetic ring, said grooves having a upper end directed toward said pole pieces and a lower end directed away from said pole pieces; and
a pin extending transversely outwardly from at least one side of each of said flux carrying members, each pin engaging a corresponding one of said sloping grooves such that arcuate movement of said nonmagnetic ring causes said pins to ride in the sloping grooves between the upper and lower ends thereof.

14. The alternator of claim 13 further including a throttle linkage attached to said nonmagnetic ring for moving said nonmagnetic ring arcuately to vary the output of said alternator.

15. The alternator of claim 13 further including:

spaced walls on said nonmagnetic ring;

each of said spaced walls having mating sloping grooves facing each other; and said pin extending transversely outwardly from said opposing sides of each of said magnetic flux carrying members to engage and ride in both of said mating slanting grooves between the upper and lower ends thereof.

* * * * *